N. Z. POTTER.
Evaporating Pan.
No. 38,839.  Patented June 9, 1863.
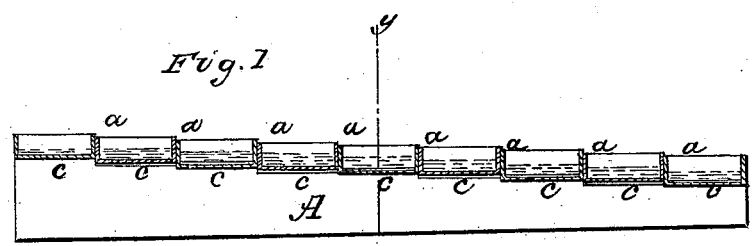
Fig. 1
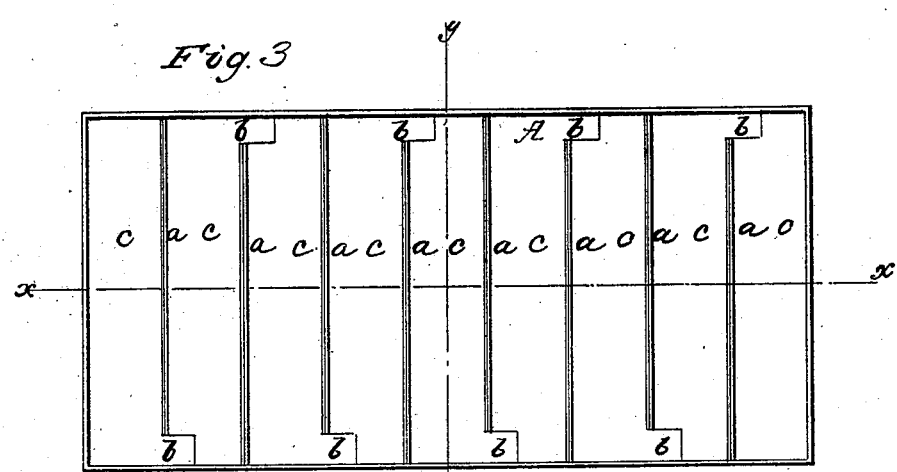
Fig. 3
Fig. 2
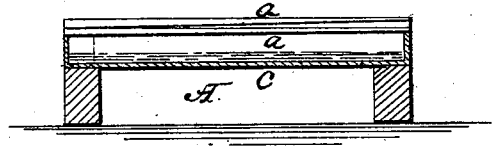

UNITED STATES PATENT OFFICE.

N. Z. POTTER, OF UNIONTOWN, ILLINOIS.

IMPROVEMENT IN EVAPORATING-PANS FOR SORGHUM-JUICE, &c.

Specification forming part of Letters Patent No. 38,839, dated June 9, 1863.

*To all whom it may concern:*

Be it known that I, N. Z. POTTER, of Uniontown, in the county of Knox and State of Illinois, have invented a new and Improved Sugar-Pan; and I do hereby declare that the following is a full, clear, and exact description of the same, reference being had to the accompanying drawings, forming a part of this specification, in which—

Figure 1 represents a longitudinal vertical section of my invention, the plan of section being indicated by the line $x\ x$, Fig. 3. Fig. 2 is a transverse vertical section of the same, taken in the plane indicated by the lines $y\ y$, Figs. 1 and 3. Fig. 3 is a plan or top view of the same.

Similar letters of reference in both views indicate corresponding parts.

This invention consists in giving to the bottoms of the several divisions of a sugar-pan a lateral inclination alternately in opposite directions in such a manner that the juice or sirup in the pan runs readily from one division to the other, and the necessity of pushing the same or the danger of scorching it is avoided.

To enable others skilled in the art to make and use my invention, I will proceed to describe it.

A represents a sugar-pan made of sheet metal or any other suitable material or materials. This pan is provided with a series of transverse partitions, $a$, with openings $b$ on opposite ends, so that a zigzag channel is formed throughout the whole pan. The bottom $c$ of each division thus formed in the pan is inclined laterally or from one side toward the other—one toward one and the next toward the opposite side thus—giving to the channel a natural fall from beginning to end, and causing the contents of the pan to flow readily throughout the entire length of the pan.

The pan may be made by crimping the sheet in the usual way, or each division may be made separately and joined together, as represented in the drawings. The channel is level at those points where the same extends from one division to the other in a direction parallel to the long sides of the pan; but at those places the pan is not exposed to the direct action of the heat, and consequently the juice is not liable to being scorched.

In ordinary pans with a flat bottom throughout, it is almost impossible to run off thick sirup without scorching, and in order to insure the sirup to flow at all it has to be pushed or crowded along, whereby the boiling operation is rendered very laborious. By my improvement the danger of scorching is completely avoided and the sirup will readily flow by its inherent gravity from one end of the channel to the other.

What I claim as new, and desire to secure by Letters Patent, is—

Giving to the bottoms of the several divisions of a sugar-pan a lateral inclination alternately in opposite directions, substantially as and for the purpose shown and described.

N. Z. POTTER.

Witnesses:
J. THURNAN,
NELSON SELBY,
A. H. POTTER.